(12) United States Patent
Xu et al.

(10) Patent No.: US 12,004,053 B2
(45) Date of Patent: *Jun. 4, 2024

(54) METHOD AND APPARATUS FOR GROUP CONTENT DELIVERY

(71) Applicant: Telefonaktiebolaget LM Ericsson (publ), Stockholm (SE)

(72) Inventors: Wenliang Xu, Shanghai (CN); Jinyang Xie, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/124,078

(22) Filed: Mar. 21, 2023

(65) Prior Publication Data
US 2023/0319515 A1 Oct. 5, 2023

Related U.S. Application Data

(63) Continuation of application No. 16/481,389, filed as application No. PCT/CN2019/094894 on Jul. 5, 2019, now Pat. No. 11,617,062.

(30) Foreign Application Priority Data

Jul. 5, 2019 (WO) ................. PCT/CN2019/075212

(51) Int. Cl.
*H04W 4/08* (2009.01)
*H04L 12/18* (2006.01)

(52) U.S. Cl.
CPC ............. *H04W 4/08* (2013.01); *H04L 12/185* (2013.01); *H04L 12/1859* (2013.01); *H04L 12/189* (2013.01)

(58) Field of Classification Search
CPC .... H04W 4/08; H04L 12/185; H04L 12/1859; H04L 12/189
See application file for complete search history.

(56) References Cited

U.S. PATENT DOCUMENTS

| 11,617,062 B2* | 3/2023 | Xu ........................ H04L 12/185 370/329 |
| 2004/0151133 A1* | 8/2004 | Yi ......................... H04W 99/00 370/312 |

(Continued)

FOREIGN PATENT DOCUMENTS

| CN | 102137082 A | 7/2011 |
| CN | 103856970 A | 6/2014 |

(Continued)

OTHER PUBLICATIONS

3GPP TS 23.468, "3rd Generation Partnership Project; Technical Specification Group Services and System Aspects; Group Communication System Enablers for LTE (GCSE_LTE); Stage 2 (Release 15)", 3rd Generation Partnership Project (3GPP), V15.0.0, Dec. 22, 2017, 32 pages.

(Continued)

*Primary Examiner* — Christine Ng
(74) *Attorney, Agent, or Firm* — NICHOLSON DE VOS WEBSTER & ELLIOTT LLP

(57) ABSTRACT

Embodiments of the present disclosure provide methods and apparatus for group content delivery. A method in a communication network which comprises the content provider node and a broadcast-multicast service node, wherein the content provider node needs to deliver a message to a group of user equipments via the broadcast multicast service node. The method comprises obtaining one or more group identifiers. The method further comprises sending the one or more group identifiers to the broadcast-multicast service node.

22 Claims, 10 Drawing Sheets

(56) References Cited

U.S. PATENT DOCUMENTS

| | | | |
|---|---|---|---|
| 2007/0275742 A1* | 11/2007 | Zhang | H04W 4/06 455/466 |
| 2012/0176953 A1* | 7/2012 | Chao | H04L 65/611 370/312 |
| 2012/0250503 A1* | 10/2012 | Willig | H04W 72/30 370/230 |
| 2015/0156249 A1* | 6/2015 | Draznin | G06Q 30/0282 709/204 |
| 2015/0245162 A1* | 8/2015 | Chao | H04W 4/70 370/312 |
| 2015/0286691 A1* | 10/2015 | Olenick | G06F 9/451 715/811 |
| 2016/0072665 A1* | 3/2016 | Xia | H04L 41/0659 370/225 |
| 2017/0238148 A1* | 8/2017 | Kolan | H04L 41/5067 370/312 |
| 2017/0272983 A1 | 9/2017 | Oyman et al. | |
| 2017/0374581 A1* | 12/2017 | Dao | H04W 76/40 |
| 2018/0041810 A1* | 2/2018 | Deshpande | H04N 21/4363 |

FOREIGN PATENT DOCUMENTS

| | | |
|---|---|---|
| CN | 105474672 A | 4/2016 |
| CN | 107210897 A | 9/2017 |

OTHER PUBLICATIONS

3GPP TS 23.682, "3rd Generation Partnership Project; Technical Specification Group Services and System Aspects; Architecture Enhancements to Facilitate Communications with Packet Data Networks and Applications (Release 16)," /16.1.0, 3GPP Organizational Partners, Dec. 2018, 126 pages.
3GPP TS 26.346, "3rd Generation Partnership Project; Technical Specification Group Services and System Aspects; Multimedia Broadcast/Multicast Service (MBMS); Protocols and codecs (Release 15)", 3rd Generation Partnership Project (3GPP), V15.3.0, Dec. 21, 2018, 284 pages.
3GPP TS 26.346, "3rd Generation Partnership Project; Technical Specification Group Services and System Aspects; Multimedia Broadcast/Multicast Service (MBMS); Protocols and Codecs (Release 16)," V16.0.0, 3GPP Organizational 3artners, Dec. 2018, 258 pages.
3GPP TS 26.348, "3rd Generation Partnership Project; Technical Specification Group Services and System Aspects; Northbound Application Programming Interface (API) for Multimedia Broadcast/ Multicast Service (MBMS) at the xMB Reference Point (Release 16)," V16.0.0, 3GPP Organizational Partners, Dec. 2018, 45 pages.
3GPP TS 29.116, "3rd Generation Partnership Project; Technical Specification Group Core Network and Terminals; Representational State Transfer Over xMB Reference Point Between Content Provider and BM-SC; (Release 15)," /15.0.0, 3GPP Organizational Partners, Jun. 2018, 112 pages.
3GPP TS 29.122, "3rd Generation Partnership Project; Technical Specification Group Core Network and Terminals; T8 Reference Point for Northbound APIs; (Release 16)," V16.0.0, 3GPP Organizational Partners, Dec. 2018, 298 pages.
3GPP TSG-SA4 Ad-Hoc Meeting, "xMB Procedures", Samsung Electronics Co. Ltd., S4h160669, 3rd Generation Partnership Project (3GPP), Nov. 21-23, 2016, 21 pages.
Ericsson, "UE Group Content Delivery", 3GPP TSG-CT WG3 Meeting #101, C3-190113, Feb. 25-Mar. 1, 2018, 69 pages.
European Communication pursuant to Article 94(3) EPC, EP App. No. 19745546.2, dated May 10, 2021, 8 pages.
European Search Report and Search Opinion, EP App. No. 19745546. 2, dated Feb. 19, 2020, 14 pages.
Examination Report, IN App. No. 202147041256, Apr. 19, 2022, 6 pages.
Final Office Action, U.S. Appl. No. 16/481,389, dated May 12, 2022, 21 pages.
First Office Action, CN App. No. 201980092077.7, dated Jan. 29, 2022, 18 pages (9 pages of English Translation and 9 pages of Original Document).
International Preliminary Report on Patentability, PCT App. No. PCT/CN2019/094894, dated Aug. 26, 2021, 5 pages.
International Search Report and Written Opinion, PCT App. No. PCT/CN2019/094894, dated Oct. 31, 2019, 9 pages.
Non-Final Office Action, U.S. Appl. No. 16/481,389, dated Feb. 18, 2022, 18 pages.
Notice of Allowance, U.S. Appl. No. 16/481,389, dated Jan. 12, 2023, 3 pages.
Notice of Allowance, U.S. Appl. No. 16/481,389, dated Nov. 21, 2022, 16 pages.
Office Action, EP App. No. 19745546.2, dated May 12, 2022, 6 pages.
Office Action, JP App. No. 2021545466, dated Oct. 24, 2022, 8 pages (4 pages of English Translation and 4 pages of Original Document).
Second Office Action, CN App. No. 201980092077.7, dated Oct. 9, 2022, 8 pages (5 pages of English Translation and 3 pages of Original Document).
3GPP, "3rd Generation Partnership Project; Technical Specification Group Services and System Aspects; Multimedia Broadcast/ Multicast Service (MBMS); Protocols and codecs (Release 14)", 3GPP TS 26.346 , V14.0.0, Sep. 30, 2016, 240 pages.
Ericsson, "Group Message Delivery", 3GPP TSG-SA WG2 Meeting #132, S2-1903981, Apr. 8-12, 2019, 5 pages.
Notice of Allowance, CN App. No. 201980092077.7, dated Mar. 10, 2023, 4 pages (2 pages of English Translation and 2 pages of Original Document).
Notice of Allowance, JP App. No. 2021-545466, dated Mar. 3, 2023, 5 pages (2 pages of English Translation and 3 pages of Original Document).
Office Action, EP App. No. 19745546.2, dated Jan. 16, 2024, 8 pages.

* cited by examiner

METHOD AND APPARATUS FOR GROUP CONTENT DELIVERY

CROSS-REFERENCE TO RELATED APPLICATIONS

This application is a continuation of application Ser. No. 16/481,389, filed Jul. 26, 2019, which is the National stage of International Application No. PCT/CN2019/094894, filed Jul. 5, 2019, which claims priority to International Application No. PCT/CN2019/075212, filed Feb. 15, 2019, which are hereby incorporated by reference.

TECHNICAL FIELD

The non-limiting and exemplary embodiments of the present disclosure generally relate to the technical field of communications, and specifically to methods and apparatuses for group content delivery.

BACKGROUND

This section introduces aspects that may facilitate a better understanding of the disclosure. Accordingly, the statements of this section are to be read in this light and are not to be understood as admissions about what is in the prior art or what is not in the prior art.

In a communication network, a network node such as a content provider may deliver a message to a group of user equipments (UEs) via a broadcast and/or multicast service. An exemplary broadcast and/or multicast architecture is xMB architecture as defined by 3rd Generation Partnership Project (3GPP). FIG. 1 shows an xMB reference model which is a copy of FIG. 5.4A-1 of clause 5.4A.1 of 3GPP TS 26.346 V15.3.0, the disclosure of which is incorporated by reference herein in its entirety. As shown in FIG. 1, a reference point between a content provider and BM-SC (Broadcast-Multicast Service Centre) is called the xMB interface. Using the xMB reference point, the content provider can invoke procedures supported by BM-SC(s) to setup and manage MBMS (Multimedia Broadcast Multicast Service) user service from BM-SC to the MBMS clients. BM-SC defines an endpoint with all supported procedures on the xMB interface, which can then be converted to SGmb procedures for the interface between BM-SC and MBMS GW (gateway) (not depicted in FIG. 1). The BM-SC may forward the received content for unicast delivery for appropriate functions (e.g., MBMS user service fallback). The control plane (xMB-C) and the user plane (xMB-U) may be optionally terminated by 3GPP defined enabler/exposure functions such as network exposure function (NEF) or Service Capability Exposure Function (SCEF), which exposes the same or a different interface to content providers.

FIG. 2a shows group message delivery by using xMB as southbound interface, which is a copy of FIG. 5.5.1-1 of clause 5.5.1 of 3GPP TS 23.682 V16.1.0, the disclosure of which is incorporated by reference herein in its entirety. The specific procedure handling for group message delivery using MBMS is described in clause 5.5.1 of 3GPP TS 23.682 V16.1.0.

FIG. 2b shows a procedure of modification of previously submitted group message, which is a copy of FIG. 5.5.2-1 of clause 5.5.2 of 3GPP TS 23.682 V16.1.0, the disclosure of which is incorporated by reference herein in its entirety. The specific procedure handling for modification of previously submitted Group Message is described in clause 5.5.2 of 3GPP TS 23.682 V16.1.0.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

The current Group Message Delivery (GMD) function doesn't support to deliver a message to a specific group of UEs via MBMS when such capability is exposed by the SCEF via GMDviaMBMSbyxMB API (Application Program Interface) as defined in 3GPP TS 29.122 V16.0.0 and the service announcement mode is set to "SACH (service announcement channel)" which means the BM-SC is responsible for service announcement information. Therefore when BM-SC receives a Create session request message from the SCEF (acting as the content provider), it will send the message to a designated Service Area via MBMS and all UEs in such area (including UEs not in the group) will receive the broadcasted message.

To overcome or mitigate at least one above mentioned problem or other problems or provide a useful solution, the embodiments of the present disclosure propose an improved group content delivery solution.

In a first aspect of the disclosure, there is provided a method at a content provider node in a communication network which comprises the content provider node and a broadcast-multicast service node, wherein the content provider node needs to deliver a message to a group of user equipments via the broadcast multicast service node. The method comprises obtaining one or more group identifiers. The method further comprises sending the one or more group identifiers to the broadcast-multicast service node.

In an embodiment, the one or more group identifiers are to be used by the broadcast-multicast service node in service announcement information for a filtering purpose.

In an embodiment, the one or more group identifiers may be sent during the content provider node creates a service with the broadcast-multicast service node and/or during the content provider node creates a session with the broadcast-multicast service node and/or during the content provider node modifies the session.

In an embodiment, when the one or more group identifiers are sent during the content provider node creates the service with the broadcast-multicast service node, the one or more group identifiers may be included in an update service request.

In an embodiment, when the one or more group identifiers are sent during the content provider node creates or modifies the session with the broadcast-multicast service node, the one or more group identifiers may be included in an update session request.

In an embodiment, when the one or more group identifiers are sent at two or more stages, the one or more group identifiers sent at a final stage may have a higher priority to be used in the service announcement information for the filtering purpose.

In an embodiment, there is an xMB interface between the content provider node and the broadcast-multicast service node.

In an embodiment, the content provider node may comprise a network exposure node and the broadcast-multicast service node may comprise Broadcast-Multicast Service Centre.

In an embodiment, the network exposure node may comprise network exposure function (NEF) or Service Capability Exposure Function (SCEF).

In an embodiment, a service announcement mode is set to service announcement channel (SACH), the broadcast-multicast service node uses the one or more group identifiers during user service announcement.

In a second aspect of the disclosure, there is provided a method at a broadcast-multicast service node. A service announcement mode is set to service announcement channel (SACH). The method comprises receiving one or more group identifiers from a content provider node. The method further comprises sending service announcement information including the one or more group identifiers to one or more user equipments.

In a third aspect of the disclosure, there is provided a method at a user equipment. The method comprises receiving service announcement information including one or more group identifiers from a broadcast-multicast service node. The one or more group identifiers is received by the broadcast-multicast service node from a content provider node. The method further comprises receiving a group message based on the one or more group identifiers.

In a fourth aspect of the disclosure, there is provided an apparatus at a content provider node in a communication network which comprises the content provider node and a broadcast-multicast service node, wherein the content provider node needs to deliver a message to a group of user equipments via the broadcast multicast service node. The apparatus comprises a processor; and a memory coupled to the processor, said memory containing instructions executable by said processor, whereby said apparatus is operative to obtain one or more group identifiers; and send the one or more group identifiers to the broadcast-multicast service node.

In a fifth aspect of the disclosure, there is provided an apparatus at a broadcast-multicast service node. A service announcement mode is set to service announcement channel (SACH). The apparatus comprises a processor; and a memory coupled to the processor, said memory containing instructions executable by said processor, whereby said apparatus is operative to receive one or more group identifiers from content provider node; and send service announcement information including the one or more group identifiers to one or more user equipments.

In a sixth aspect of the disclosure, there is provided an apparatus at a user equipment. The apparatus comprises a processor; and a memory coupled to the processor, said memory containing instructions executable by said processor, whereby said apparatus is operative to receive service announcement information including one or more group identifiers from a broadcast-multicast service node, wherein the one or more group identifiers is received by the broadcast-multicast service node from a content provider node; and receive a group message based on one or more group identifiers.

In a seventh aspect of the disclosure, there is provided an apparatus at a content provider node. The apparatus comprises an obtaining unit configured to obtain one or more group identifiers and a sending unit configured to send the one or more group identifiers to a broadcast-multicast service node.

In an eighth aspect of the disclosure, there is provided an apparatus at a broadcast-multicast service node. The apparatus comprises a receiving unit configured to receive one or more group identifiers from content provider node, a generating unit configured to generate a group filter based on the one or more group identifiers and a sending unit configured to send service announcement information including the group filter to one or more user equipments.

In a ninth aspect of the disclosure, there is provided an apparatus at a UE. The apparatus comprises a receiving unit configured to receive service announcement information including a group filter from a broadcast-multicast service node, wherein the group filter is generated by the broadcast-multicast service node based on the one or more group identifiers received from a content provider node, and a receiving unit configured to receive a group message based on the group filter.

In a tenth aspect of the disclosure, there is provided a computer program product comprising instructions which, when executed on at least one processor, cause the at least one processor to carry out the method according to the first aspect of the disclosure.

In an eleventh aspect of the disclosure, there is provided a computer program product comprising instructions which, when executed on at least one processor, cause the at least one processor to carry out the method according to the second aspect of the disclosure.

In a twelfth aspect of the disclosure, there is provided a computer program product comprising instructions which, when executed on at least one processor, cause the at least one processor to carry out the method according to the third aspect of the disclosure.

In a thirteenth aspect of the disclosure, there is provided a computer-readable storage medium storing instructions which, when executed on at least one processor, cause the at least one processor to carry out the method according to the first aspect of the disclosure.

In a fourteenth aspect of the disclosure, there is provided a computer-readable storage medium storing instructions which, when executed on at least one processor, cause the at least one processor to carry out the method according to the second aspect of the disclosure.

In a fifteenth aspect of the disclosure, there is provided a computer-readable storage medium storing instructions which, when executed on at least one processor, cause the at least one processor to carry out the method according to the third aspect of the disclosure.

According to embodiments of the disclosure, a content provider node may send one or more group identifiers to a broadcast-multicast service node. The broadcast-multicast service node may generate a group filter based on the one or more group identifiers and send service announcement information including the group filter to one or more user equipments (UEs). The UEs may receive a group message based on the group filter. For example, in the xMB architecture, the xMB interface may be enhanced with one or more group identifiers, which will be used by the BM-SC in the user service announcement information for filtering purpose. The proposed group content delivery solution can solve the aforementioned issue to avoid message being broadcasted to wrong UEs.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
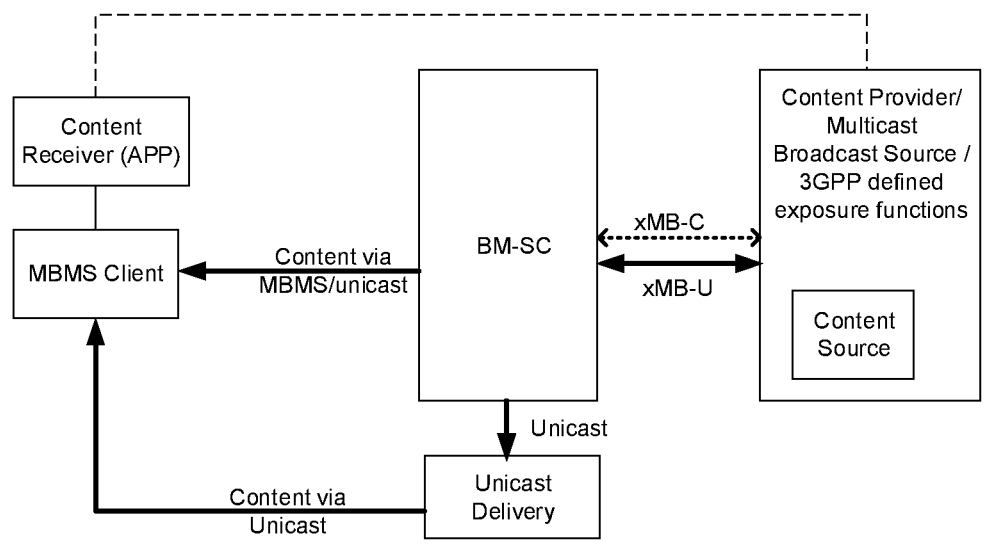
FIG. 1 shows an xMB reference model.
Figure 2A:
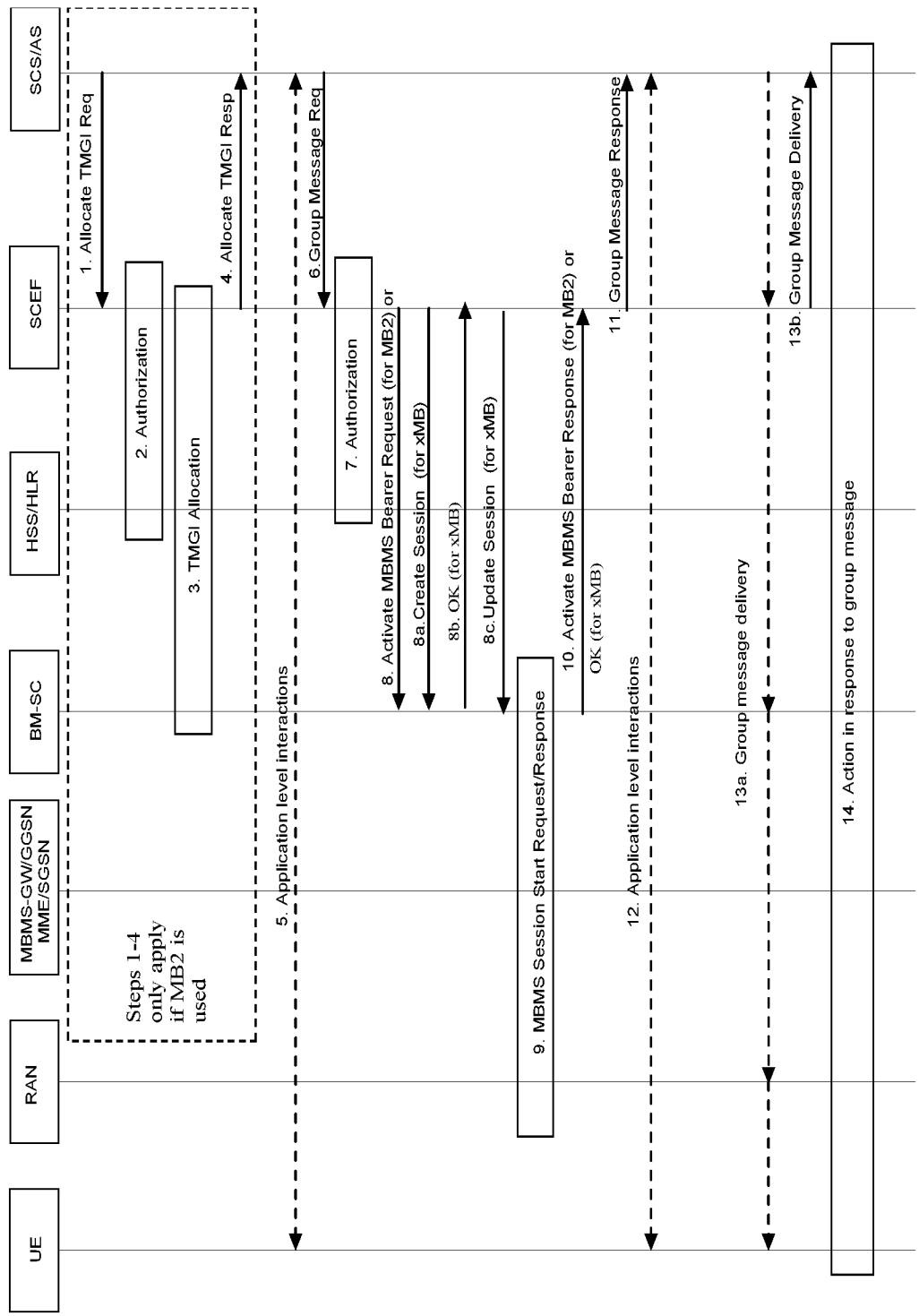
FIG. 2a shows group message delivery by using xMB as southbound interface.
Figure 2B:
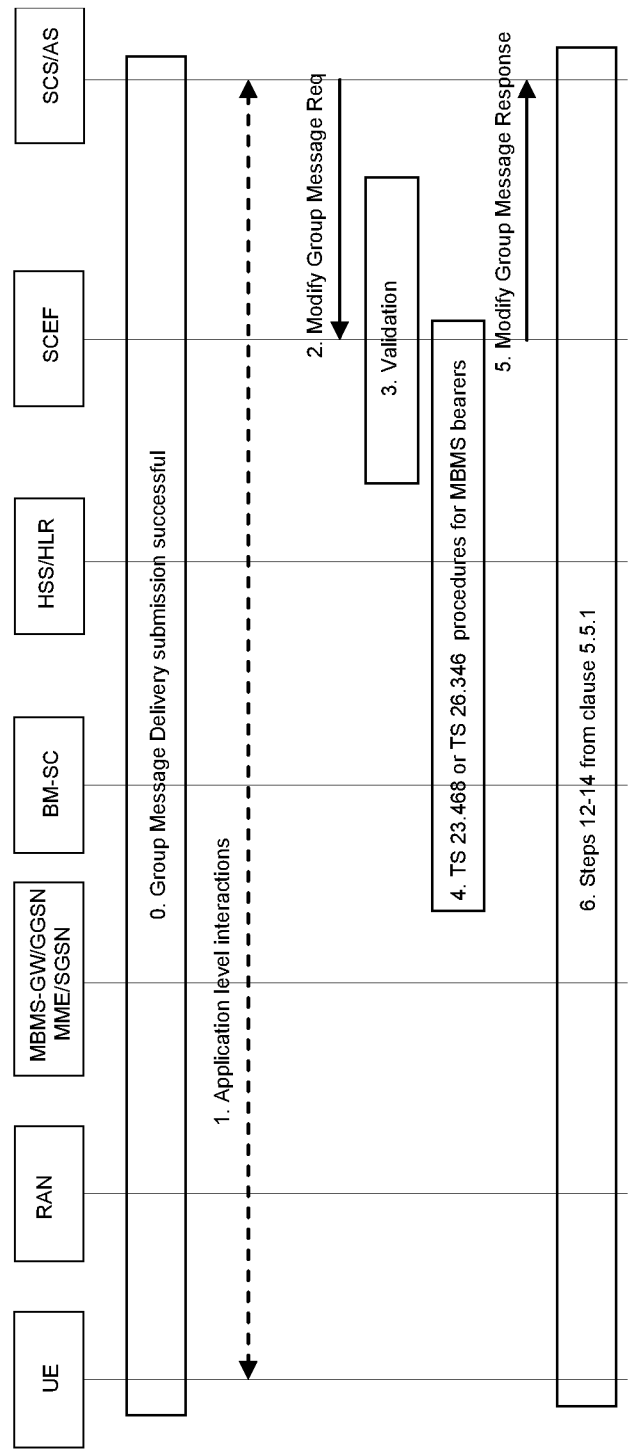
FIG. 2b shows a procedure of modification of previously submitted group message.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable wireless/wired communication standards such as new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the communication protocols as defined by a standard organization such as 3GPP. For example, the communication protocols as defined by 3GPP may comprise the second generation (2G), third generation (3G), fourth generation (4G), 4.5G, the fourth generation (5G) communication protocols, and/or any other protocols either currently known or to be developed in the future.

A communication network may comprise various devices. For example, in a wireless communication network such as a 3GPP-type cellular network, the network node may comprise a content provider node such as Services Capability Server (SCS) and Application Server(AS), a broadcast-multicast service node such as Broadcast-Multicast Service Centre (BM-SC), and a network exposure node network exposure function (NEF) or Service Capability Exposure Function (SCEF), etc., which may offer numerous services to customers who are interconnected by an access network device.

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP (3rd Generation Partnership Project), such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

For illustrative purposes, several embodiments of the present disclosure will be described in the context of xMB architecture as shown in FIG. 1. Those skilled in the art will appreciate, however, that the concept and principle of the several embodiments of the present disclosure may be more generally applicable to any other suitable communication networks.

Figure 3:
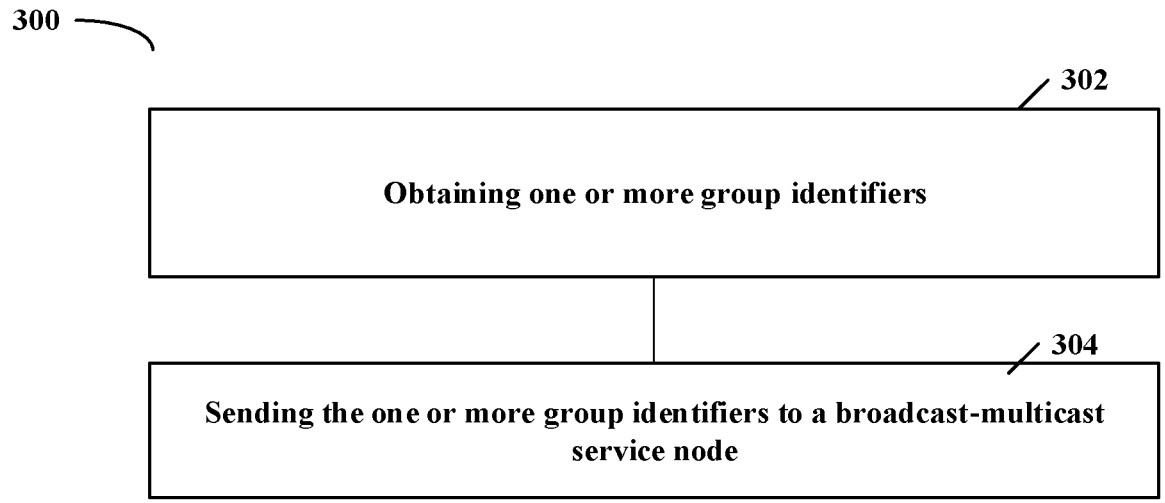
FIG. 3 shows a flowchart of a method according to an embodiment of the present disclosure.

FIG. 3 shows a flowchart of a method according to an embodiment of the present disclosure, which may be performed by an apparatus implemented in/as a content provider node or communicatively coupled to a content provider node. As such, the apparatus may provide means for accomplishing various parts of the method 300 as well as means for accomplishing other processes in conjunction with other components. The content provider node may be a node which needs to deliver a message to a group of UEs. For example, the content provider node may be Content Provider/Multicast Broadcast Source/3GPP defined exposure functions as shown in FIG. 1. In an embodiment, the content provider node may comprise a network exposure node. For example, the network exposure node may comprise network exposure function (NEF) or Service Capability Exposure Function (SCEF). In another embodiment, the content provider node may comprise SCS/AS. In other communication networks, the content provider node may be any other suitable node which needs to deliver a message to a group of UEs.

At block 302, the content provider node may obtain one or more group identifiers. The one or more group identifiers may be obtained in various ways. For example, the content provider node may configure the one or more group identifiers by itself or receive them from another node. As an example, when the content provider node is SCS/AS, it may configure the one or more group identifiers by itself. As another example, when the content provider node is the network exposure node such as NEF or SCEF, it may receive the one or more group identifiers from SCS/AS. The one or more group identifiers may be network internal or external group identifiers. In an embodiment, when the one or more group identifiers are network external group identifiers, the content provider node may translate them into the network internal group identifiers by itself or by using another network node such as HLR/HSS.

At block 304, the content provider node may send the one or more group identifiers to a broadcast-multicast service node. The broadcast-multicast service node may be a network node which can support broadcast-multicast service. For example, in xMB architecture, the broadcast-multicast service node may be BM-SC. In other communication networks, the broadcast-multicast service node may be any other suitable node which can support broadcast-multicast service. The one or more group identifiers may be included in any suitable existing or new message. For example, the one or more group identifiers may be included in a service creation request, a service modification request, a session creation request, or a session modification request, etc.

In an embodiment, before provisioning of services at the broadcast-multicast service node, the content provider node may be authenticated and authorized to perform service management functions. If the content provider node wants to modify or remove the provisioned services, it can do so by using a valid access token. For example, the authentication procedure may be used by the content provider node and the broadcast-multicast service node to authenticate each other. The content provider node may be authenticated with the broadcast-multicast service node when the content provider node wants to provision new services or manage existing services. Similarly, the broadcast-multicast service node may be authenticated by the content provider when the broadcast-multicast service node needs to send reports and notifications to the content provider node. Before using any of the procedure associated with the broadcast-multicast service node, the content provider may first use the authorization procedure to retrieve its authorization. After successful authorization based on the content provider's representative's credentials, operations such as service and session creation within the granted permissions become possible. For example, in the xMB architecture, it may use the authentication and authorization procedure as defined in clause 5.4A.3 of 3GPP TS 26.346 V15.3.0.

In an embodiment, the content provider node may send the one or more group identifiers to the broadcast-multicast service node at one or more stages. For example, the one or more group identifiers may be sent during the content provider node creates a service with the broadcast-multicast service node and/or during the content provider node creates a session with the broadcast-multicast service node and/or during the content provider node modifies the session. For example, when the content provider node creates a service with the broadcast-multicast service node, it may send the one or more group identifiers for example in a service creation/update request. When the content provider node creates a session with the broadcast-multicast service node, it may send the one or more group identifiers for example in a session creation/update request. When the content provider node modifies a session with the broadcast-multicast service node, it may send the one or more group identifiers for example in a service update/modification request.

In an embodiment, when the one or more group identifiers are sent during the content provider node creates the service with the broadcast-multicast service node, the one or more group identifiers may be included in an update service request. For example, in the xMB architecture, the update service request may be similar to the service update request as defined in clause 5.4A.4.4 of 3GPP TS 26.346 V15.3.0.

In an embodiment, when the one or more group identifiers are sent during the content provider node creates or modifies the session with the broadcast-multicast service node, the one or more group identifiers are included in an update session request. For example, in the xMB architecture, the update session request may be similar to the session update request as defined in clause 5.4A.5.4 of 3GPP TS 26.346 V15.3.0.

In an embodiment, the one or more group identifiers may be used by the broadcast-multicast service node in service announcement information for a filtering purpose. For example, the broadcast-multicast service node may generate a group filter based on the one or more group identifiers and send service announcement information including the group filter to one or more user equipments such as MBMS clients. The syntax of the group filter may be similar to that as specified by the schema of the Filter Description fragment in clause 11.2B0.4 of 3GPP TS 26.346 V15.3.0. The group filter may be composed of group ID elements: each group filter element may be instantiated with a list of string identifiers classifying the targeted groups as group ID elements. Multiple instantiations of this element may be used to classify content targeted to different groups and could be mapped to various types of target group information, e.g., social group, age group, gender, profession, ethnic group, etc. An MBMS client may selectively receive contents with the group filter values known to match the profile of the user.

In an embodiment, when the one or more group identifiers are sent at two or more stages, the one or more group identifiers sent at a final stage have a higher priority to be used in the service announcement information for the filtering purpose. The final stage refers to the last stage in time. For example, the content provider node may first create a service with the broadcast-multicast service node, and then may modify the service, and then may create a session with the broadcast-multicast service node, and then may modify the session. In this case, the one or more group identifiers sent during the content provider node modifies the session may have a higher priority to be used in the service announcement information for the filtering purpose than the one or more group identifiers sent during other stage(s), and so on.

In an embodiment, there is an xMB interface between the content provider node and the broadcast-multicast service node. The xMB interface is similar to the corresponding xMB interface as defined in 3GPP TS 26.346 V15.3.0. The messages between the content provider node and the broadcast-multicast service node may be exchanged through the xMB interface.

In an embodiment, the content provider node may comprise a network exposure node and the broadcast-multicast service node may comprise Broadcast-Multicast Service Centre (BM-SC).

In an embodiment, the network exposure node may comprise network exposure function (NEF) or Service Capability Exposure Function (SCEF).

Figure 4:
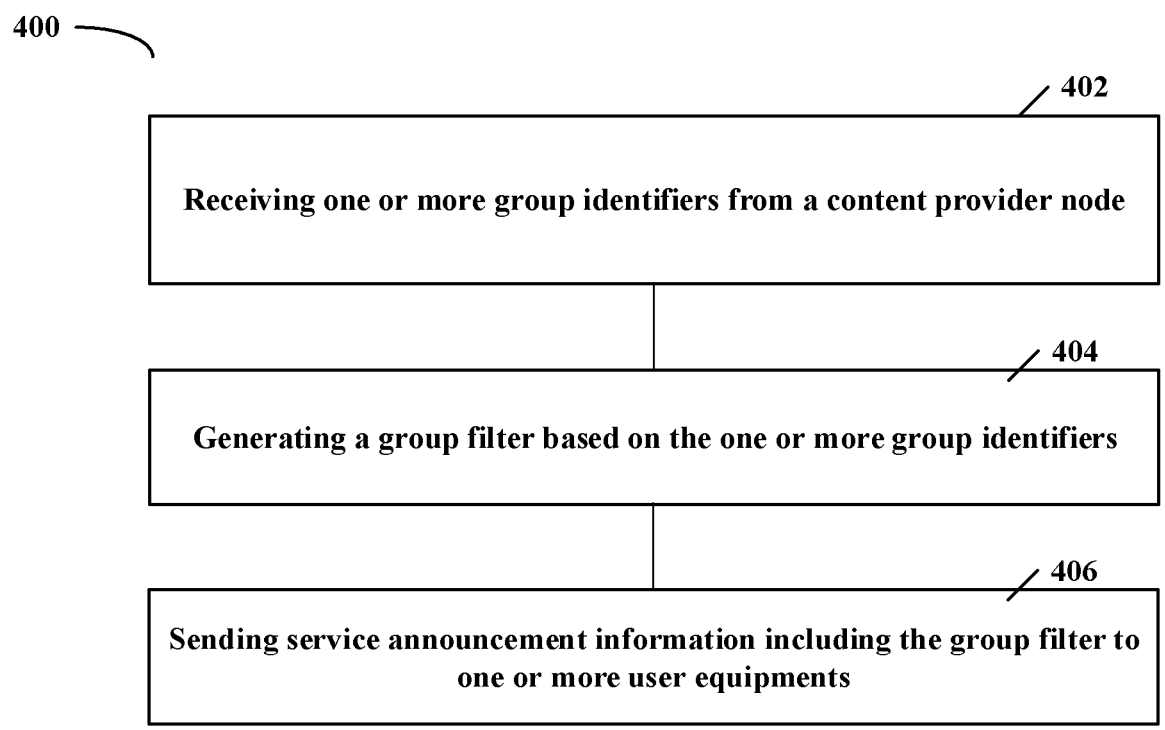
FIG. 4 shows a flowchart of a method according to another embodiment of the present disclosure.

FIG. 4 shows a flowchart of a method according to an embodiment of the present disclosure, which may be performed by an apparatus implemented in a broadcast-multicast service node or communicatively coupled to a broadcast-multicast service node. As such, the apparatus may provide means for accomplishing various parts of the method 400 as well as means for accomplishing other processes in conjunction with other components. For some parts which have been described in the above embodiments, detailed description thereof is omitted here for brevity.

At block 402, the broadcast-multicast service node may receive one or more group identifiers from a content provider node. For example, the content provider node may send one or more group identifiers to the broadcast-multicast service node at block 304 of FIG. 3, and then the broadcast-multicast service node may receive the one or more group identifiers from the content provider node.

In an embodiment, the one or more group identifiers may be received during the content provider node creates a service with the broadcast-multicast service node and/or during the content provider node creates a session with the broadcast-multicast service node and/or during the content provider node modifies the session.

In an embodiment, when the one or more group identifiers are received during the content provider node creates the service with the broadcast-multicast service node, the one or more group identifiers may be included in an update service request.

In an embodiment, when the one or more group identifiers are received during the content provider node creates the session with the broadcast-multicast service node, the one or more group identifiers may be included in an update session request.

In an embodiment, when the one or more group identifiers are received at two or more stages, the one or more group identifiers received at a final stage have a higher priority to be used in the service announcement information.

At block 404, the broadcast-multicast service node may generate a group filter based on the one or more group identifiers. In an embodiment, the syntax of the group filter may be similar to that as specified by the schema of the Filter Description fragment in clause 11.2B.4 of 3GPP TS 26.346 V15.3.0.

In an embodiment, the group filter may include one or more group filter identifiers. One or more group filters can be derived from the received one or more group identifiers in the broadcast-multicast service node such as BM-SC. The mapping relationship may be N:M for the one or more group filters and the received one or more group identifiers in the broadcast-multicast service node such as BM-SC.

At block 406, the broadcast-multicast service node may send service announcement information including the group filter to one or more user equipments. In an embodiment, the service announcement information may be similar to the corresponding service announcement information as described in clause 5.5.1 of 3GPP TS 23.682 V16.1.0 except that it further includes the group filter. The broadcast-multicast service node may send the service announcement information at any suitable time point, for example, when generating the group filter and/or when there is a change of the group filter and/or when a group message is to be delivered, etc. In an embodiment, the broadcast-multicast service node may send service announcement information including the group filter to one or more user equipments during the content provider node creates a session with the broadcast-multicast service node and/or during the content provider node modifies the session.

In an embodiment, there is an xMB interface between the content provider node and the broadcast-multicast service node. The xMB interface is similar to the corresponding xMB interface as defined in 3GPP TS 26.346 V15.3.0. The messages between the content provider node and the broadcast-multicast service node may be exchanged through the xMB interface.

In an embodiment, the content provider node may comprise a network exposure node and the broadcast-multicast service node may comprise Broadcast-Multicast Service Centre (BM-SC).

In an embodiment, the network exposure node may comprise network exposure function (NEF) or Service Capability Exposure Function (SCEF).

Figure 5:
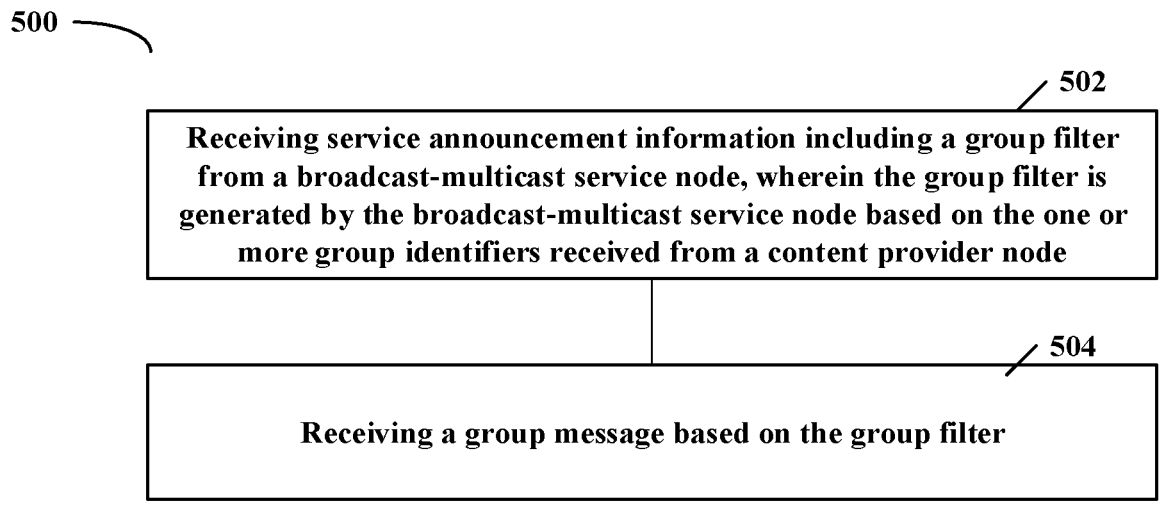
FIG. 5 shows a flowchart of a method according to another embodiment of the present disclosure.

FIG. 5 shows a flowchart of a method according to an embodiment of the present disclosure, which may be performed by an apparatus implemented in a UE or communicatively coupled to a UE. As such, the apparatus may provide means for accomplishing various parts of the method 500 as well as means for accomplishing other processes in conjunction with other components. For some parts which have been described in the above embodiments, detailed description thereof is omitted here for brevity.

At block 502, the UE may receive service announcement information including a group filter from a broadcast-multicast service node. The group filter may be generated by the broadcast-multicast service node based on the one or more group identifiers received from a content provider node as described above.

At block 504, the UE may receive a group message based on the group filter. For example, the UE may selectively receive contents with the group filter values known to match the profile of the user of the UE.

Figure 6:
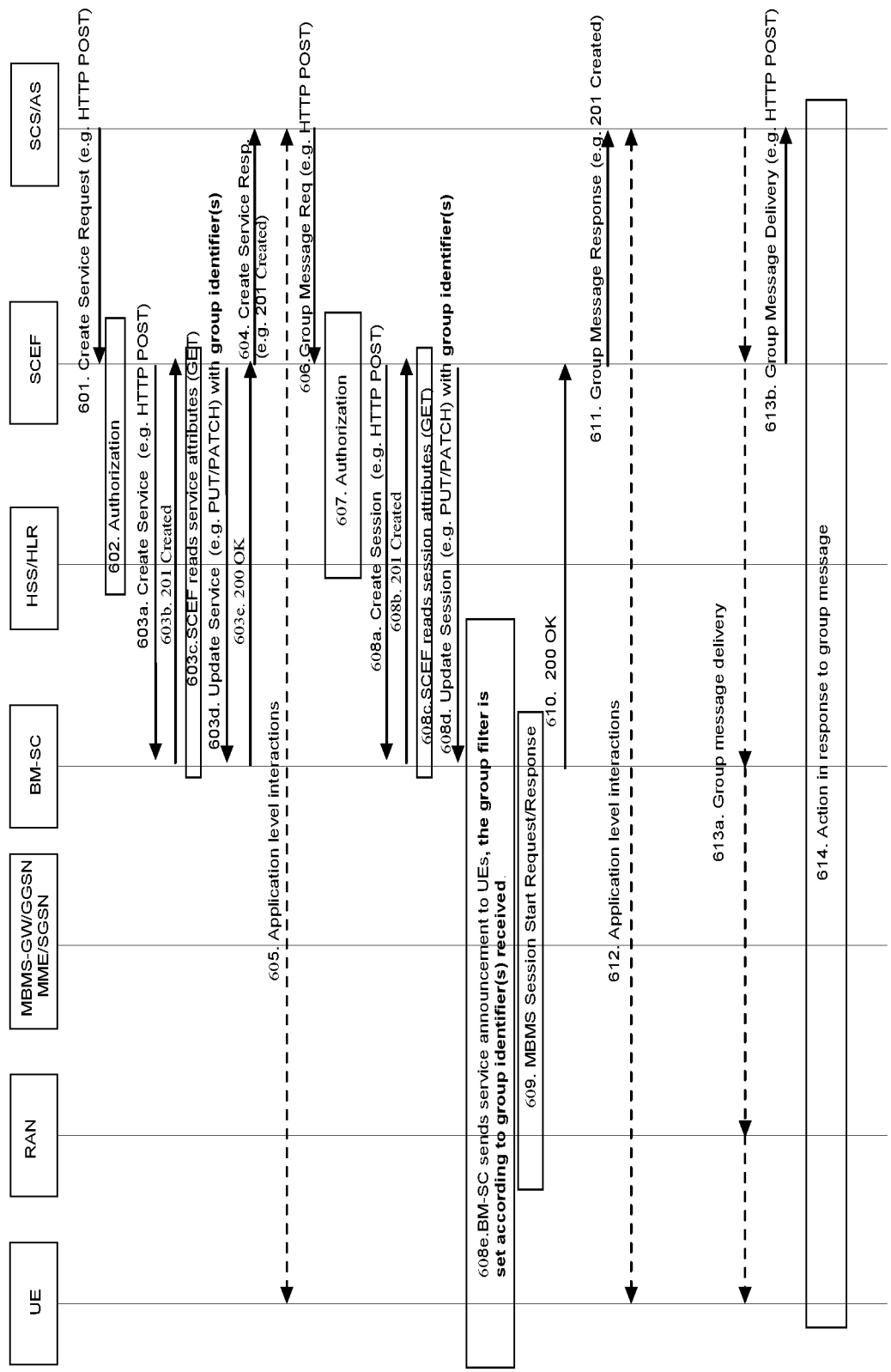
FIG. 6 shows a flowchart of a procedure of group message delivery according to an embodiment of the present disclosure.

FIG. 6 shows a flowchart of a procedure of group message delivery according to an embodiment of the present disclosure. In this embodiment, the group message delivery is implemented in the xMB architecture. The network elements UE, RAN (Radio access network), MBMS-GW/GGSN (Gateway GPRS (General Packet Radio Services) support node) MME(Mobility Management Entity)/SGSN (serving GPRS support node), BM-SC, HSS/HLR(Home Subscriber Server/Home Location Register), SCEF and SCS/AS are similar to those as shown in FIG. 5.5.1-1 of clause 5.5.1 of 3GPP TS 23.682 V16.1.0.

At step 601, SCS/AS may send a create service request such as Hypertext Transfer Protocol (HTTP) POST to SCEF.

At step 602, SCEF may perform an authorization procedure with HSS/HLR. The authorization procedure may be similar to the corresponding authorization procedure as described in clause 5.4A.3.3 of 3GPP TS 26.346 V15.3.0.

At step 603a, SCEF may send a create service request such as HTTP POST to BM-SC. The create service request may be similar to the corresponding create service as described in clause 5.4A.4.2 of 3GPP TS 26.346 V15.3.0.

At step 603b, BM-SC may send a create service response such as "201 Created" to SCEF.

At step 603c, SCEF may reads service attributes for example by using HTTP GET from BM-SC. This step may be similar to the Get Service Properties as described in clause 5.4A.4.3 of 3GPP TS 26.346 V15.3.0.

At step 603d, SCEF may send an update service request with group identifier(s) such as HTTP PUT/PATCH to BM-SC. The update service request may be similar to the service update as described in clause 5.4A.4.4 of 3GPP TS 26.346 V15.3.0 except that it further includes the group identifier(s).

At step 603e, BM-SC may send an update service response such as "200 OK" to SCEF.

At step 604, SCEF may send a create service response such as "201 Created" to SCS/AS.

Steps 605, 606, 607, 608a are similar to steps 5, 6, 7, 8a, 8b as shown in FIG. 5.5.1-1 of clause 5.5.1 of 3GPP TS 23.682 V16.1.0.

At step 608c, SCEF may read session attributes for example by using HTTP GET from BM-SC. This step may be similar to the Get Session Properties as described in clause 5.4A.5.3 of 3GPP TS 26.346 V15.3.0.

At step 608d, SCEF may send an update session request with group identifier(s) such as HTTP PUT/PATCH to BM-SC. The update session request may be similar to the session update as described in clause 5.4A.4.4 of 3GPP TS 26.346 V15.3.0 except that it further includes the group identifier(s).

At step 608d, BM-SC may send service announcement including the group filter to UE(s). The group filter may be set according to the received one or more group identifiers as described above. This step may be similar to the corresponding step as described in clause 5.5.1 of 3GPP TS 23.682 V16.1.0 except that the service announcement further includes the group filter.

Steps 609, 610, 611, 612, 613a, 613b and 614 are similar to steps 9, 10, 11, 12, 13a, 13b and 14 as shown in FIG. 5.5.1-1 of clause 5.5.1 of 3GPP TS 23.682 V16.1.0.

Figure 7:
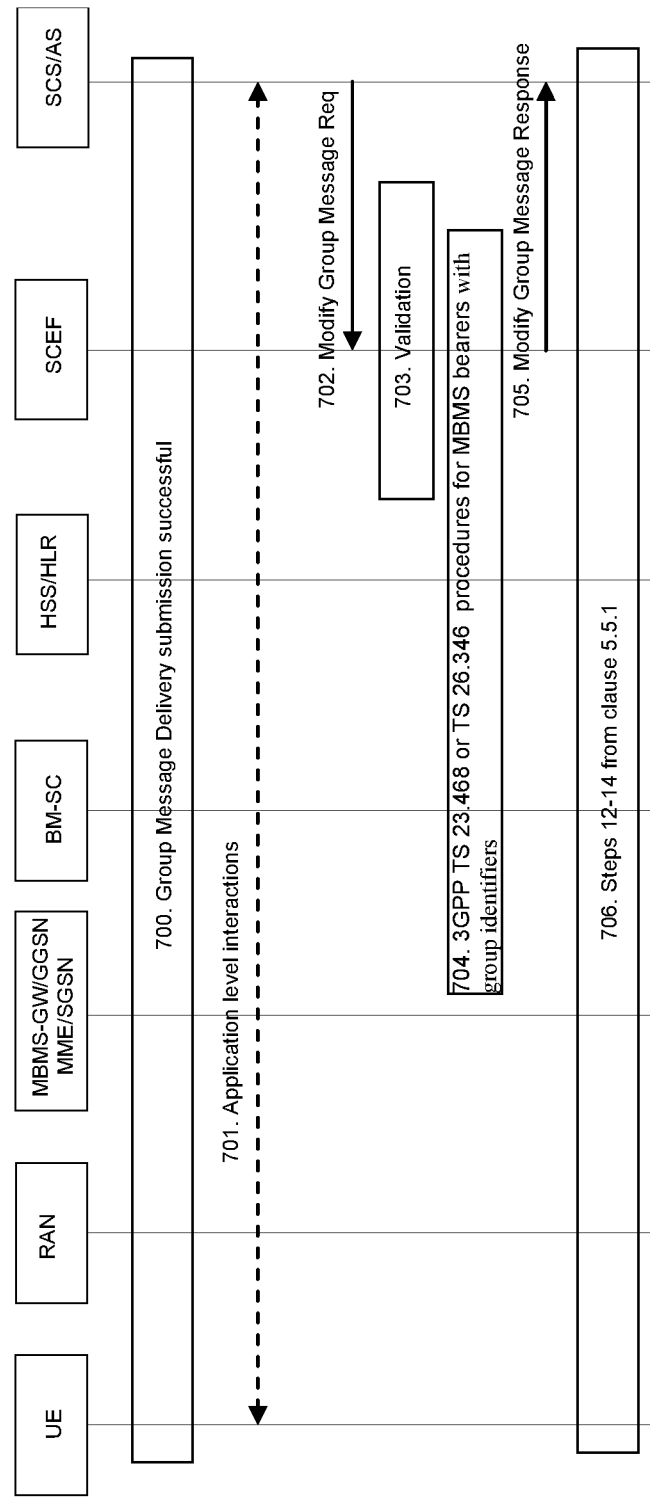
FIG. 7 shows a flowchart of a procedure of modification of group message request according to an embodiment of the present disclosure.

FIG. 7 shows a flowchart of a procedure of modification of group message request according to an embodiment of the present disclosure. In this embodiment, the group message delivery is implemented in the xMB architecture. The network elements UE, RAN (Radio access network), MBMS-GW/GGSN (Gateway GPRS (General Packet Radio Services) support node) MME(Mobility Management Entity)/SGSN(serving GPRS support node), BM-SC, HSS/HLR (Home Subscriber Server/Home Location Register), SCEF and SCS/AS are similar to those as shown in FIG. 5.5.2-1 of clause 5.5.2 of 3GPP TS 23.682 V16.1.0. Steps 700-706 of FIG. 7 are similar to the corresponding steps 0-6 of FIG. 5.5.2-1 of clause 5.5.2 of 3GPP TS 23.682 V16.1.0 except that step 704 for session modification is related to group identifier(s). For example, SCEF may send an update session request with group identifier(s) such as HTTP PUT/PATCH to BM-SC.

In an embodiment, Table 5.2.1.1-1 of 3GPP TS 29.116 V15.0.0 may add a Property Token group-ids as following, the disclosure of which is incorporated by reference herein in its entirety.

| Property Token | JSON Value Type | Child Parameter | Units | Defaults Values | Property Description | Applicability (NOTE) |
|---|---|---|---|---|---|---|
| group-ids | array | | None | Empty list | This parameter contains a list of group identifiers, applicable if the service-announcement-mode is set to "SACH". It is used by the BM-SC in the service announcement for filtering purpose. | GroupContentDelivery |

The service instance resource with the property group-ids can be shown using the following JSON (JavaScript Object Notation) schema:
"group-ids": {
"type": "array",
"description": "List of group identifiers",
  "items": {
    type": "string"
  }
}

In an embodiment, Table 5.2.2-1 of 3GPP TS 29.116 V15.0.0 may add a Property Token group-ids as following.

| Property Token | JSON Value Type | Defaults | Parameter Description | Applicability (NOTE) |
|---|---|---|---|---|
| group-ids | array | None Empty list | This parameter contains a list of group identifiers, applicable if the service-announcement-mode is set to "SACH". The BM-SC shall map the group identifier to a proper group filter or use it directly as the group filter (as defined in subclause 11.2B.3A of 3GPP TS 26.346 [3]) during user service announcement (see 3GPP TS 23.246 [2]). | GroupContentDelivery |

The session instance resource with the property group-ids for each session can be shown using the following JSON schema:
"group-ids": {
  "type": "array",
  "description": "List of group identifiers",
    "items": {
      type": "string"
    }
}

In an embodiment, Table 9.1-1 of 3GPP TS 29.116 V15.0.0 may add a Feature GroupContentDelivery as following:

| Feature | M/O | Description |
|---|---|---|
| GroupContentDelivery | O | This feature indicates the support of delivering contents to a group of UEs. |

In an embodiment, JSON Schema of Annex B (normative) of 3GPP TS 29.116 V15.0.0 may add information related to "group-ids" as followings
"group-ids": {
  "type": "array",
  "description": "List of group identifiers",
    "items": {
      type": "string"
    }
}

According to embodiments of the disclosure, a content provider node may send one or more group identifiers to a broadcast-multicast service node. The broadcast-multicast service node may generate a group filter based on the one or more group identifiers and send service announcement information including the group filter to one or more user equipments (UEs). The UEs may receive a group message based on the group filter. For example, in the xMB architecture, the xMB interface may be enhanced with one or more group identifiers, which will be used by the BM-SC in the user service announcement information for filtering purpose. The proposed group content delivery solution can solve the aforementioned issue to avoid message being broadcasted to wrong UEs.

Figure 8A:
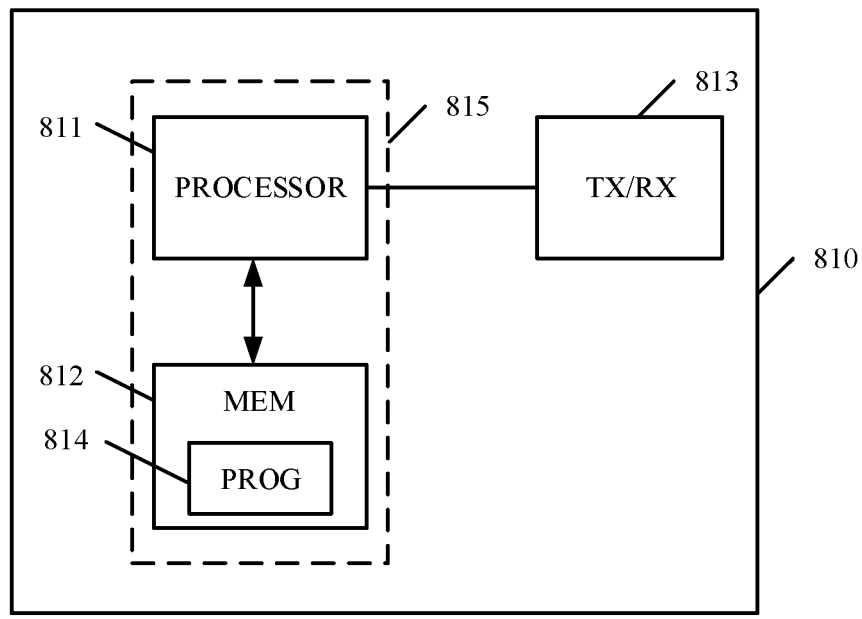
FIG. 8a illustrates a simplified block diagram of apparatus according to an embodiment of the present disclosure.
Figure 8B:
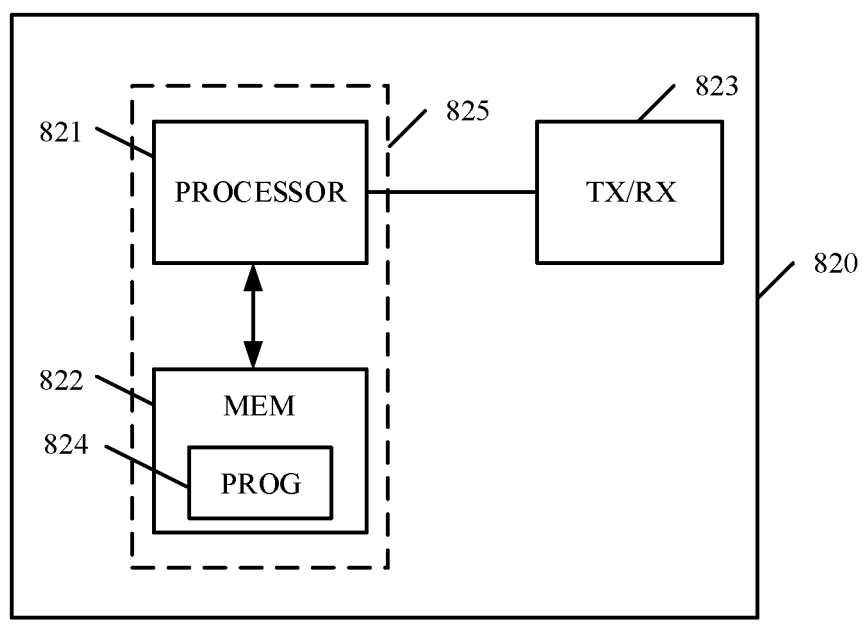
FIG. 8b illustrates a simplified block diagram of apparatus according to another embodiment of the present disclosure.
Figure 8C:
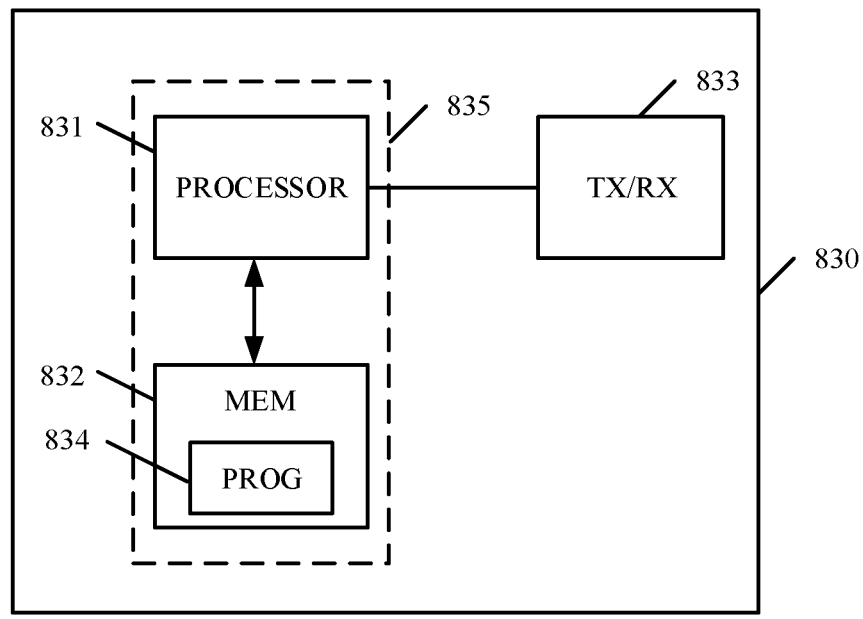
FIG. 8c illustrates a simplified block diagram of apparatus according to another embodiment of the present disclosure.

FIG. 8a illustrates a simplified block diagram of an apparatus 810 that may be embodied in/as a content provider node according to an embodiment of the present disclosure. FIG. 8b illustrates an apparatus 820 that may be embodied in/as a broadcast-multicast service node according to an embodiment of the present disclosure. FIG. 8c illustrates an apparatus 830 that may be embodied in/as a UE according to an embodiment of the present disclosure.

The apparatus 810 may comprise at least one processor 811, such as a data processor (DP) and at least one memory (MEM) 812 coupled to the processor 811. The apparatus 810 may further comprise a transmitter TX and receiver RX 813 coupled to the processor 811. The MEM 812 stores a program (PROG) 814. The PROG 814 may include instructions that, when executed on the associated processor 811, enable the apparatus 810 to operate in accordance with the embodiments of the present disclosure, for example to perform the method 300. A combination of the at least one processor 811 and the at least one MEM 812 may form processing means 815 adapted to implement various embodiments of the present disclosure.

The apparatus 820 comprises at least one processor 821, such as a DP, and at least one MEM 822 coupled to the processor 821. The apparatus 820 may further comprise a transmitter TX and receiver RX 823 coupled to the processor 821. The MEM 822 stores a PROG 824. The PROG 824 may include instructions that, when executed on the associated processor 821, enable the apparatus 820 to operate in accordance with the embodiments of the present disclosure, for example to perform the method 400. A combination of the at least one processor 821 and the at least one MEM 822 may form processing means 825 adapted to implement various embodiments of the present disclosure.

The apparatus 830 comprises at least one processor 831, such as a DP, and at least one MEM 832 coupled to the processor 831. The apparatus 830 may further comprise a transmitter TX and receiver RX 833 coupled to the processor 831. The MEM 832 stores a PROG 834. The PROG 834 may include instructions that, when executed on the associated processor 831, enable the apparatus 830 to operate in accordance with the embodiments of the present disclosure, for example to perform the method 500. A combination of the at least one processor 831 and the at least one MEM 832 may form processing means 835 adapted to implement various embodiments of the present disclosure.

Various embodiments of the present disclosure may be implemented by computer program executable by one or more of the processors 811, 821 and 831, software, firmware, hardware or in a combination thereof.

The MEMs 812, 822 and 832 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 811, 821 and 831 may be of any type suitable to the local technical environment, and may include one or more of general purpose computers, special purpose computers, microprocessors, digital signal processors (DSPs) and processors based on multicore processor architecture, as non-limiting examples.

Figure 9:
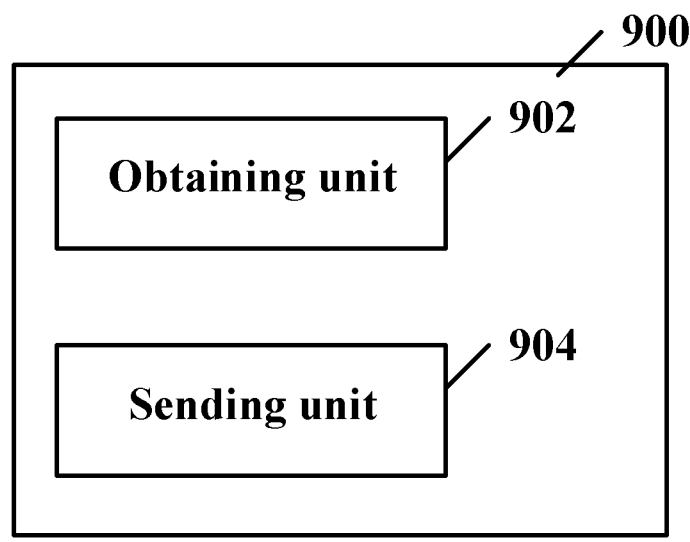
FIG. 9 illustrates a simplified block diagram of apparatus according to another embodiment of the present disclosure.

Reference is now made to FIG. 9, which illustrates a schematic block diagram of an apparatus 900 at a content provider node. The apparatus 900 is operable to carry out the exemplary methods related to the content provider node as described above.

As shown in FIG. 9, the apparatus 900 may comprise an obtaining unit 902 configured to obtain one or more group identifiers and a sending unit 904 configured to send the one or more group identifiers to a broadcast-multicast service node.

Figure 10:
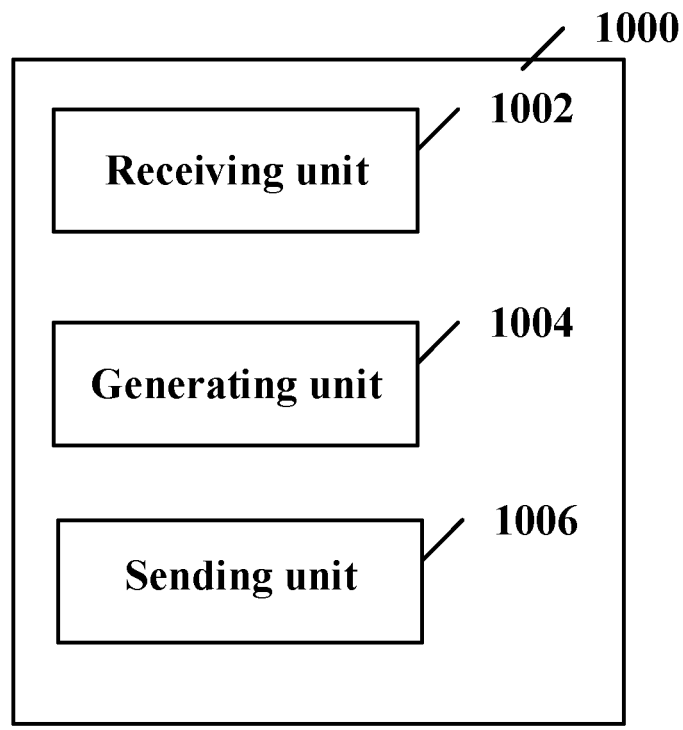
FIG. 10 illustrates a simplified block diagram of apparatus according to another embodiment of the present disclosure.

Reference is now made to FIG. 10, which illustrates a schematic block diagram of an apparatus 1000 at a broadcast-multicast service node. The apparatus 1000 is operable to carry out the exemplary methods related to the broadcast-multicast service node as described above.

As shown in FIG. 10, the apparatus 1000 may comprise a receiving unit 1002 configured to receive one or more group identifiers from content provider node, a generating unit 1004 configured to generate a group filter based on the one or more group identifiers and a sending unit 1006 configured to send service announcement information including the group filter to one or more user equipments.

Figure 11:
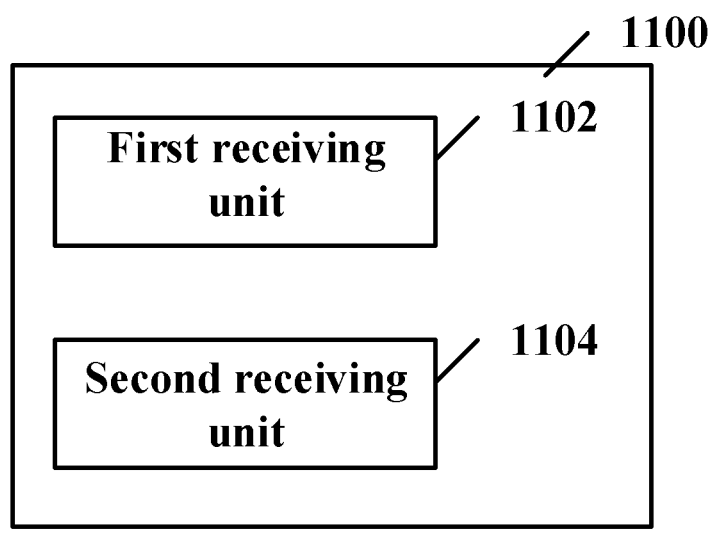
FIG. 11 illustrates a simplified block diagram of apparatus according to another embodiment of the present disclosure.

Reference is now made to FIG. 11, which illustrates a schematic block diagram of an apparatus 1000 at a UE. The apparatus 1100 is operable to carry out the exemplary methods related to the UE as described above.

As shown in FIG. 11, the apparatus 1100 may comprise a first receiving unit 1102 configured to receive service announcement information including a group filter from a broadcast-multicast service node, wherein the group filter is generated by the broadcast-multicast service node based on the one or more group identifiers received from a content provider node, and a second receiving unit 1104 configured to receive a group message based on the group filter.

It would be appreciated that, some units or modules in the apparatus 900, 1000 and 1100 can be combined in some implementations. For example, in one embodiment, it is possible to use a single transceiving unit to send and receive the information.

According to an aspect of the disclosure it is provided a computer program product being tangibly stored on a computer readable storage medium and including instructions which, when executed on at least one processor, cause the at least one processor to carry out the method related to the content provider node as described above.

According to an aspect of the disclosure it is provided a computer program product being tangibly stored on a computer readable storage medium and including instructions which, when executed on at least one processor, cause the at least one processor to carry out the method related to the broadcast-multicast service node as described above.

According to an aspect of the disclosure it is provided a computer program product being tangibly stored on a computer readable storage medium and including instructions which, when executed on at least one processor, cause the at least one processor to carry out the method related to the UE as described above.

According to an aspect of the disclosure it is provided a computer-readable storage medium storing instructions which when executed by at least one processor, cause the at least one processor to perform the method related to the content provider node as described above.

According to an aspect of the disclosure it is provided a computer-readable storage medium storing instructions which when executed by at least one processor, cause the at least one processor to perform the method related to the broadcast-multicast service node as described above.

According to an aspect of the disclosure it is provided a computer-readable storage medium storing instructions which when executed by at least one processor, cause the at least one processor to perform the method related to the UE as described above.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:
1. A method at a broadcast-multicast service node, the method comprising:
  obtaining one or more group identifiers, wherein the one or more group identifiers are applicable when a service announcement mode is set to service announcement channel, wherein the service announcement mode is set to service announcement channel for session modification that includes group identifier modification, and wherein the one or more group identifiers are delivered using javascript object notation schema that indicates an array value type, the array to be an empty list by default; and
  sending service announcement information including the one or more group identifiers to one or more user equipments.
2. The method of claim 1, wherein the javascript object notation schema is applicable in group content delivery.
3. The method of claim 1, wherein the one or more group identifiers are based on corresponding external group identifiers.
4. The method of claim 1, wherein the one or more group identifiers are obtained from a content provider.
5. The method of claim 4, wherein a Service Capability Exposure Function (SCEF) acts as a content provider of the content provider.
6. The method of claim 1, wherein the one or more group identifiers are sent as a list of group identifiers within the javascript object notation schema.
7. An apparatus to implement a broadcast-multicast service node, comprising:
  a processor and a memory storing instructions that, when executed by the processor, causing the apparatus to perform:
    obtaining one or more group identifiers, wherein the one or more group identifiers are applicable when a service announcement mode is set to service announcement channel, wherein the service announcement mode is set to service announcement channel for session modification that includes group identifier modification, and wherein the one or more group identifiers are delivered using javascript object notation schema that indicates an array value type, the array to be an empty list by default; and
    sending service announcement information including the one or more group identifiers to one or more user equipments.
8. The apparatus of claim 7, wherein the javascript object notation schema is applicable in group content delivery.
9. The apparatus of claim 7, wherein the one or more group identifiers are based on corresponding external group identifiers.
10. The apparatus of claim 7, wherein the one or more group identifiers are obtained from a content provider.
11. The apparatus of claim 10, wherein a Service Capability Exposure Function (SCEF) acts as the content provider.
12. The apparatus of claim 7, wherein the one or more group identifiers are sent as a list of group identifiers within the javascript object notation schema.
13. A method at a content provider node, the method comprising:
  obtaining one or more group identifiers, wherein the one or more group identifiers are applicable when a service announcement mode is set to service announcement channel, wherein the service announcement mode is set to service announcement channel for session modification that includes group identifier modification, and wherein the one or more group identifiers are delivered using javascript object notation schema that indicates an array value type, the array to be an empty list by default; and sending the one or more group identifiers to a broadcast-multicast service node.

14. The method of claim 13, wherein the javascript object notation schema is applicable in group content delivery.

15. The method of claim 13, wherein the one or more group identifiers are based on corresponding external group identifiers.

16. The method of claim 13, wherein a Service Capability Exposure Function (SCEF) acts as the content provider node.

17. The method of claim 13, wherein the one or more group identifiers are sent within a service modification request.

18. An apparatus to implement a content provider node, comprising:

a processor and a memory storing instructions that, when executed by the processor, causing the apparatus to perform:

obtaining one or more group identifiers, wherein the one or more group identifiers are applicable when a service announcement mode is set to service announcement channel, wherein the service announcement mode is set to service announcement channel for session modification that includes group identifier modification, and wherein the one or more group identifiers are delivered using javascript object notation schema that indicates an array value type, the array to be an empty list by default; and sending the one or more group identifiers to a broadcast-multicast service node.

19. The apparatus of claim 18, wherein the javascript object notation schema is applicable in group content delivery.

20. The apparatus of claim 18, wherein the one or more group identifiers are based on corresponding external group identifiers.

21. The apparatus of claim 18, wherein a Service Capability Exposure Function (SCEF) acts as the content provider node.

22. The apparatus of claim 18, wherein the one or more group identifiers are sent within a service modification request.

* * * * *